United States Patent
Kaneda et al.

[11] Patent Number: 5,173,807
[45] Date of Patent: Dec. 22, 1992

[54] OPTICAL INSTRUMENT

[75] Inventors: Naoya Kaneda; Yasuhiro Tamekuni; Youichi Iwasaki, all of Yokohama, Japan

[73] Assignee: Canon Kabushiki Kaisha, Tokyo, Japan

[21] Appl. No.: 499,815

[22] Filed: Mar. 27, 1990

[30] Foreign Application Priority Data

Mar. 27, 1989 [JP] Japan .................................. 1-75734

[51] Int. Cl.⁵ ............................................ G02B 15/14
[52] U.S. Cl. ................................... 359/698; 354/402; 358/227
[58] Field of Search ........................ 350/423, 500, 429; 354/404, 400, 402; 359/694-698, 676; 358/227

[56] References Cited

U.S. PATENT DOCUMENTS

| | | | |
|---|---|---|---|
| 4,145,732 | 3/1979 | Pandres | 350/430 |
| 4,156,933 | 5/1979 | Pandres | 350/429 |
| 4,161,756 | 7/1979 | Thomas | 350/429 |
| 4,193,667 | 3/1990 | Yasukuni et al. | 350/429 |
| 4,697,891 | 10/1987 | Kawai | 350/429 |
| 4,774,538 | 9/1988 | Kawai | 354/402 |
| 4,861,146 | 8/1989 | Hatase et al. | 350/429 |
| 4,920,369 | 4/1990 | Kaneda et al. | 354/400 |
| 4,950,054 | 8/1990 | Wada et al. | 354/400 |
| 4,962,400 | 10/1990 | Otani et al. | 354/195.13 |
| 4,991,944 | 2/1991 | Hirao et al. | 359/698 |
| 5,005,956 | 4/1991 | Kaneda et al. | 359/698 |
| 5,027,147 | 6/1991 | Kaneda | 354/400 |
| 5,092,670 | 3/1992 | Preston | 354/400 |
| 5,113,214 | 5/1992 | Nagata et al. | 354/402 |
| 5,122,825 | 6/1992 | Tokumaru et al. | 354/400 |

*Primary Examiner*—Bruce Y. Arnold
*Assistant Examiner*—James Phan
*Attorney, Agent, or Firm*—Fitzpatrick, Cella, Harper & Scinto

[57] ABSTRACT

This specification discloses an optical instrument comprising a focusing lens, a zooming lens, first detecting means for detecting the focus state of the focusing lens, and control means for moving the zooming lens in conformity with the output of the first detecting means and making the size of an object which is occupied in the picture plane substantially constant, the control means varying the movement speed of the zooming lens in conformity with the output of the first detecting means. The specification also discloses an optical instrument comprising a focusing lens, a zooming lens, first detecting means for detecting the focus state of the focusing lens, second detecting means for detecting the magnification change state of the zooming lens, and control means for moving the zooming lens in conformity with the relative position information of the two lenses based on the outputs of the first detecting means and the second detecting means and making the size of an object which is occupied in the picture plane substantially constant, the control means varying the conditions for the start of the movement of the zooming lens in conformity with the output of the first detecting means.

14 Claims, 5 Drawing Sheets

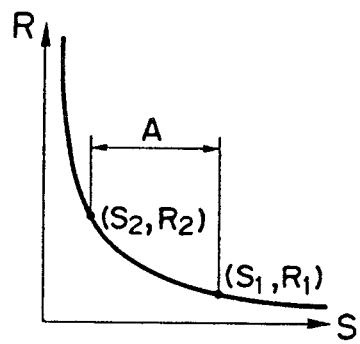
FIG. 2
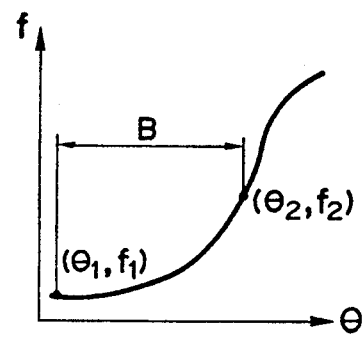
FIG. 3
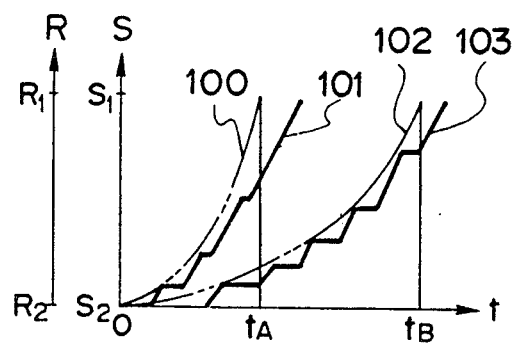
FIG. 4
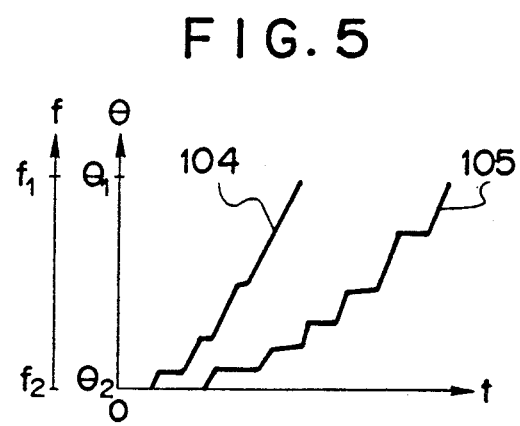
FIG. 5
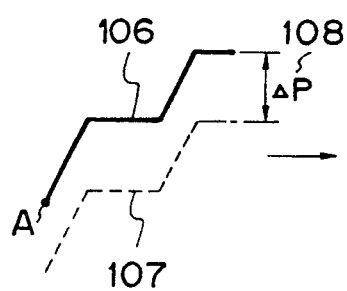
FIG. 6
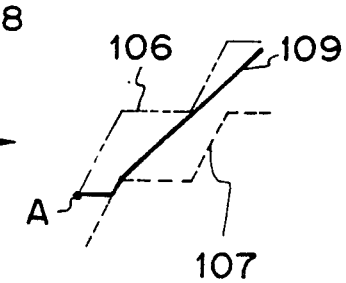
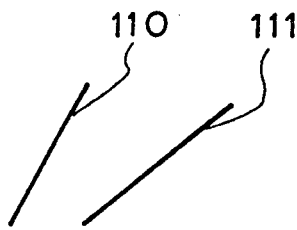
FIG. 7

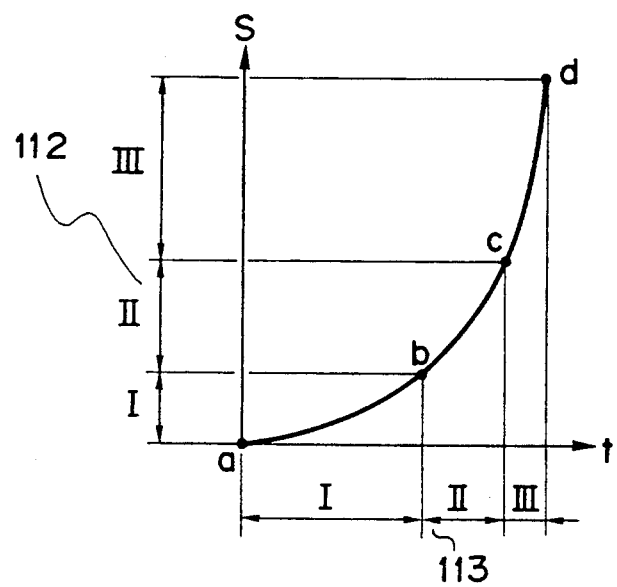

F I G. 10
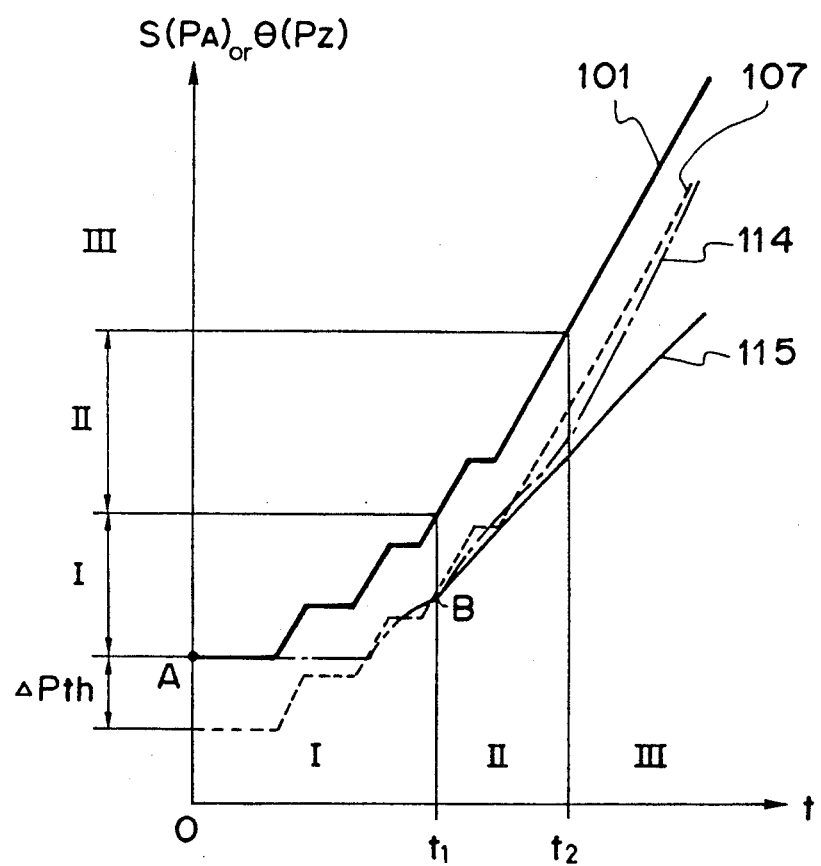

OPTICAL INSTRUMENT

BACKGROUND OF THE INVENTION

1. Field of the Invention

This invention relates to an optical instrument having the zooming function.

2. Related Background Art

In recent years, there has been proposed a function of keeping the size of an object which is occupied in the picture plane (hereinafter referred to as the auto zooming function) always constant even if the object distance changes.

Heretofore, such auto zooming function has been provided by calculating a focal length f to be assumed from the object distance R and the size x of the object which is occupied in the picture plane, and setting a lens to the calculated focal length f.

Also, as a simple method, in Japanese Patent Application No. 1-2836 by the applicant, a distance ring and a zoom ring are disposed at a predetermined initial position, whereafter AF is started from that position and the pulse number of a rotatable pulse board operatively associated with an AF motor or the like is counted, whereby the absolute position of the distance is known and also, the pulse number of a rotatable pulse board operatively associated with a zoom motor or the like is made coincident with the pulse number of the AF motor, whereby auto zooming is established. That is, in the case of a four-group zoom lens of the most popular forward lens focusing type, the relation between the amount of axial movement S of the forward lens and the object distance R is substantially such as shown in FIG. 2 of the accompanying drawings. Also, the relation between the angle of rotation $\theta$ of the zoom ring and the focal length f is shown in FIG. 3 of the accompanying drawings. In this case, when the ranges A and B in the figures are suitably selected, the values of $f_2/R_2$ and $f_1/R_1$ become equal to each other and it becomes possible to make $\theta = \theta_1 + A \times (\theta_2 - \theta_1)$ coincident with $f/\theta$ when $S = S_1 + A \times (S_1 - S_2)$ ($0 \leq A \leq 1$). Accordingly, if the patterns and gear ratios of the two pulse boards are set so that the pulse number of the AF motor generated in the area A and the pulse number of the zoom motor generated in the area B may be the same number, and $\theta_1$ and $S_1$, or $\theta_2$ and $S_2$ are set to the initial reset positions and further, the pulse count values here are both rendered into O, then the auto zooming function will be established by thereafter making the pulse number of the zoom motor coincident with the pulse number of the AF motor (however, when the design is made such that the pulse number of the zoom motor increases for wide → tele, the AF motor is designed such that the pulse thereof is increased by the rotation in the direction of close distance→infinity).

In the above-described system, however, the driving, stoppage and reversal of the AF motor are all replaced by those of the zoom motor and therefore, magnification change becomes stiff, and this has also led to a case where the picture plane becomes very unsightly.

SUMMARY OF THE INVENTION

One aspect of this invention is the provision of an optical instrument with the auto zooming function in which in conformity with the position of a focusing lens, the movement speed of a zooming lens is varied or the relative position information of the two lenses for determining the start of the movement of the zooming lens is varied to thereby provide a smooth and plain auto zooming function.

BRIEF DESCRIPTION OF THE DRAWINGS

FIG. 2 is a graph showing the relation between the position of a lens group for focus adjustment and the in-focus distance.

FIG. 3 is a graph showing the relation between the angle of rotation of a zoom ring and the focal length.

FIG. 4 is a graph showing the relation between the movement speed of an object and the behavior of the lens group for focus adjustment.

FIG. 5 is a graph showing a case where the zooming operation is performed by conventional auto zoom means when the distance ring is moved as shown in FIG. 4.

FIGS. 6 and 7 show the basic concept for smoothing the movement of a zooming optical system.

FIG. 8 shows an example of the division of the amount of axial movement of the forward lens which is a feature of the present invention.

FIG. 9 shows the substance of speed which is a feature of the present invention.

FIG. 10 is a graph showing the effect of a first embodiment of the present invention.

DESCRIPTION OF THE PREFERRED EMBODIMENTS

Figure 1:
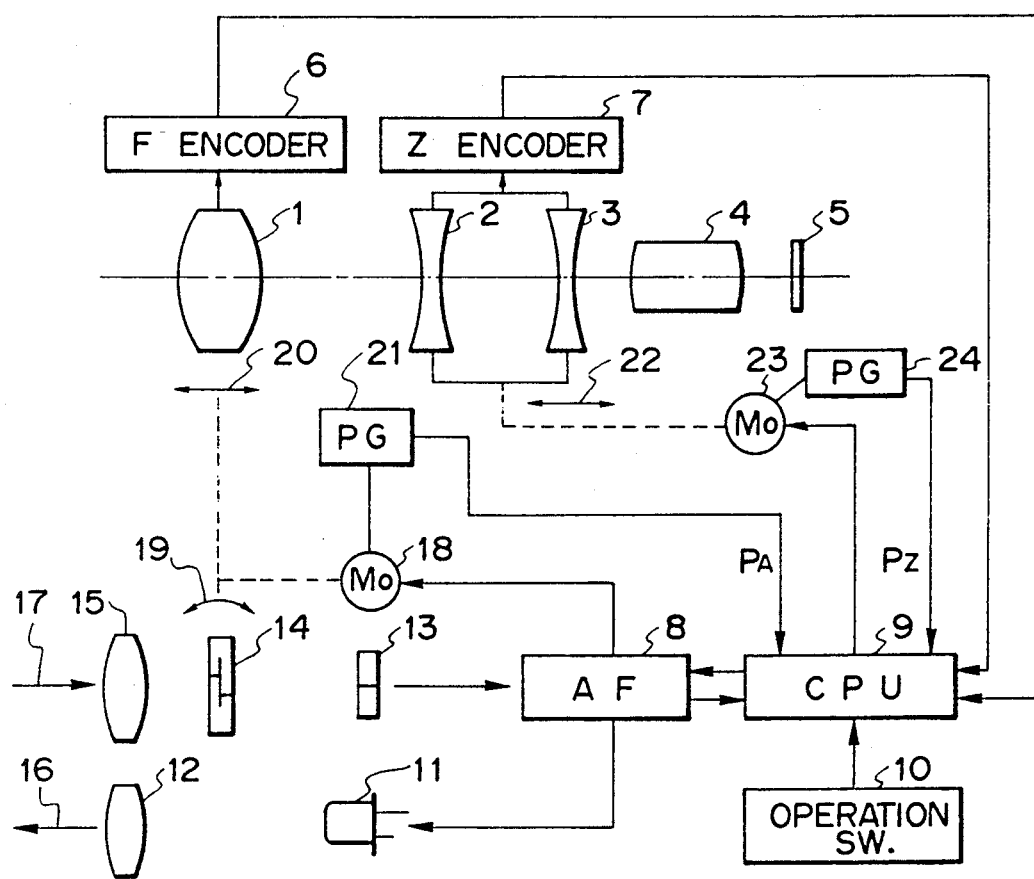
FIG. 1 is a block diagram showing the construction of an embodiment of the present invention.

The basic effect of an embodiment of the present invention will hereinafter be described. FIG. 4 is a graph in which the abscissa represents time and the ordinate represents the axially moved position S of a forward lens when an object which was at an object distance $R_0$(m) when time t=0 came near to a distance $r_1$ at a predetermined movement speed at a time $t_A$ or $t_B$, and the conversion of S into R can be done by the relation of FIG. 2. In FIG. 4, lines 100 and 102 show a relation for always obtaining the just in-focus. The difference between the lines 100 and 102 is due to the difference in the movement speed of the object, and the movement speed in the case of the line 100 is a little over twice as high as the movement speed in the case of the line 102. In contrast with such ideal lines 100 and 102, lines 101 and 103 show the actual movements of a distance ring. The main reasons for staircase-like movement (i.e., movement of repeated driving and stoppage) are that the position of the distance ring which is judged as in-focus by an automatic focus adjusting device has a certain predetermined width (this width will hereinafter be referred to as the insensitive zone during in-focus), that the width which is judged as non-in-focus after the lens has once been in focus (this width will hereinafter be referred to as the insensitive zone after in-focus) is greater than the insensitive zone during in-focus, and that the control of the speed of an AF motor is not effected carefully.

Even if such driving and stoppage are repeated, if they are within the insensitive zone after in-focus, there will not occur out-of-focus which will pose a problem. Accordingly, regarding the driving of the distance ring, there will be no problem in practical use even if driving and stoppage are repeated, and it has rather been a problem that even if the distance ring is driven continuously in the same direction, the in-focus lens position cannot be caught up with and out-of-focus occurs.

According to the aforementioned Japanese Patent Application No. 1-2836 by the applicant, the value of the pulse board operatively associated with the AF motor (or the distance ring) which is indicative of the position of the distance ring is always made coincident with the value of the pulse board operatively associated with the zoom motor (or the zoom ring) which is indicative of the position of the zoom ring, whereby auto zooming is accomplished. Thus, the movement of the zoom ring when the movement of the distance ring as indicated by the lines 101 and 103 in FIG. 4 takes place traces the movement of the distance ring completely at 1:1 as indicated by lines 104 and 105 in FIG. 5 when the delay of response is neglected.

Such staircase-like movement of the zoom ring appears as a variation in the angle of view. Accordingly, this leads to a disadvantage that the picture plane becomes difficult to see.

As a method often used to solve this problem, it is conceivable to use the speed of the zoom motor properly in conformity with the absolute value $|\Delta P|$ of the difference between the value $P_A$ of the pulse board of the AF motor and the value $P_Z$ of the pulse board of the zoom motor. In FIGS. 6 and 7, the horizontal direction indicates time and the vertical direction indicates the value $P_A (=P_Z)$ of the pulse board, and at the start of a point A, line 106 indicates the movement of the distance ring, and line 107 is a threshold value line. When the control of the speed of the zoom motor is not effected, the line 106 indicates the movement of the distance ring and also indicates the movement of the zoom ring. Also, where two zoom motor speeds as indicated by lines 110 and 111 in FIG. 7 are used, there takes place a movement as indicated by line 109 in FIG. 6 and thus, smooth movement as compared with the line 106 (i.e., elimination of the staircase-like movement) takes place (if the difference is within the threshold value after $P_A = P_Z$, the zoom motor is stopped, and if $P_A \neq P_Z$ and the difference is outside the threshold value, the speed indicated by line 110 in FIG. 7 is provided, and if the difference comes inside the threshold value, the speed indicated by line 111 in FIG. 7 is provided).

Accordingly, there is seen the effect of such a threshold value of $\Delta P$ and the variability of speed conforming to the value of $\Delta P$.

Now, even when the movement speed of the object is constant as shown in FIG. 4, there is such relation between the amount of axial movement of the forward lens and the in-focus distance as shown in FIG. 2 and therefore, it becomes necessary for effecting auto zooming smoothly that for a longer distance, the AF motor (or the zoom motor) move more slowly and for a nearer distance, the AF motor (or the zoom motor) move faster.

In the case of the two-speed control as shown in FIGS. 6-7, if the difference between lines 110 and 111, i.e., two speeds, is made great, it will become possible to decrease the frequency of "stoppage". In such case, the variation in the angle of view during the change over between a high speed and a low speed becomes readily conspicuous and after all, stiff response of the zoom motor cannot be completely eliminated.

In order to eliminate this, in the present embodiment, as shown in FIG. 8, the range is divided into three areas I–III in conformity with the axially moved position S of the forward lens (although here are shown three areas, this is not restrictive), and the substance of speed when the two-speed control of the zoom motor is effected is changed in conformity with each of these areas I–III. An example of it is shown in FIG. 9. In FIG. 9, the gradients of segments indicate speeds. As a basic concept, speed is made high in the near side (the area III) and low in the far side.

As an example of a method of determining speed, there is conceivable a method in which, for example, the speed of a man's walking which is highest in frequency of photographing is adopted as the speed of the object and the differentiation value at each of points a, b, c and d which are boundaries among the areas I, II and III of the graph is calculated and the high speed of the area I is defined as the differentiation value at b and the low speed of the area I is defined as the differentiation value at a and in the area II, the high speed and the low speed are defined as the differentiation values at c and b, respectively, and in the area III, the high speed and the low speed are defined as the differentiation values at d and c, respectively.

FIG. 10 shows the movement of the zoom motor when such division into the areas I–III has been effected. In the figure, line 101 indicates the movement of the distance ring. In contrast, it is line 107 that indicates $\Delta P$ and $\Delta Pth$ for speed change-over. When the same speed control as that described with reference to FIG. 6 is effected while being changed over by I–III as shown in FIG. 9, the result is such as indicated by line 114, and after the start from a point A, there is no great speed fluctuation and it becomes possible to control the driving of the zoom motor smoothly. If only the speed used in the area I is applied to all of the areas I–III, the result will be such as indicated by line 115 and a great delay of response will arise.

FIG. 1 is a block diagram of a camera apparatus which is suited to carry out the present invention. In FIG. 1, the reference numeral 1 designates a forward lens group whose position is variable for focusing. The reference numeral 2 denotes a variator lens group for zooming. The reference numeral 3 designates a compensator lens group interlocked with the variator lens group 2 with a predetermined relation. The reference numeral 4 denotes a relay lens group for imaging. The reference numeral 5 designates a solid state image pick-up device such as a CCD. The reference numeral 6 denotes encoder means for detecting the predetermined reset position of the forward lens group as a focusing lens. The reference numeral 7 designates encoder means for detecting the predetermined reset position (the predetermined focal length) of the variator lens group 2 and compensator lens group 3 as a zooming lens. The reference numeral 8 denotes an AF circuit. The reference numeral 9 disignates a CPU. The reference numeral 10 denotes an operation switch for setting the start or the like of the auto zooming function. The reference numeral 11 designates an i RED light-emitting element which is one of the constituents of an active type distance measuring device and projects near-infrared light onto the object field. The reference numeral 12 denotes a light projection lens. The reference numeral 13 designates a light receiving element divided into two areas as shown. In the distance measuring device, when the outputs of these two light receiving areas become substantially equal to each other, it is judged to be in-focus. The reference numeral 14 denotes a parallel flat plate made of acryl or the like and rotatable in response to the forward or backward axial movement of the lens group for focus adjustment. The reference numeral 15 designates a light receiving lens for causing a spot light projected upon the object by a light projection element to be imaged on the light receiving element 13. The reference numeral 16 denotes a projected light ray. The reference numeral 17 designates a received light ray. The reference numeral 18 denotes an AF motor which is driving means for forwardly and backwardly axially moving the forward lens group 1 for focus adjustment. The reference numeral 19 designates an arrow indicating the movement of the parallel flat plate 14. The reference numeral 20 denotes an arrow indicating the forward and backward axial movements of the forward lens group 1. The reference numeral 21 designates a pulse generator such as a pulse board for knowing the amount of rotation of the AF motor 18. The reference numeral 22 denotes an arrow indicating that the variator lens group 2 and the compensator lens group 3 change their positions for zooming. The reference numeral 23 designates a zoom motor for zooming. The reference numeral 24 denotes a pulse generator such as a pulse board for knowing the amount of rotation of the zoom motor 23.

When the auto zooming function is started by the operation switch 10, the position of the forward lens group 1 for focus adjustment (i.e., a distance ring, not shown, which embraces the forward lens) and the positions of the variator lens group 2 and the compensator lens group 3 (i.e., a zoom ring, not shown) are disposed at predetermined positions, whereupon the count values of the pulse generators 21 and 24 are both rendered into a predetermined value (e.g. 0). After this resetting operation, the forward lens group 1 has its position made variable on the basis of the result of the distance measurement by the AF circuit 8. In this case, the counting of the pulse generator 21 is continued. However, in the CPU 9, the counting is held when the distance ring comes out of the area indicated by A in FIG. 2 with the aid of the encoder means 6. Also in the CPU 9, the difference between the count values $P_Z$ and $P_A$ into which the pulse generator 24 has been read is further found so that this difference may become 0, and in this case, the speed stored in ROM within the CPU 9 is read out in conformity with the value of the count value $P_A$ (i.e., the amount of forward axial movement of the forward lens) and the value of the difference $\Delta P$, and the zoom motor 23 is driven at this speed.

Figure 11:
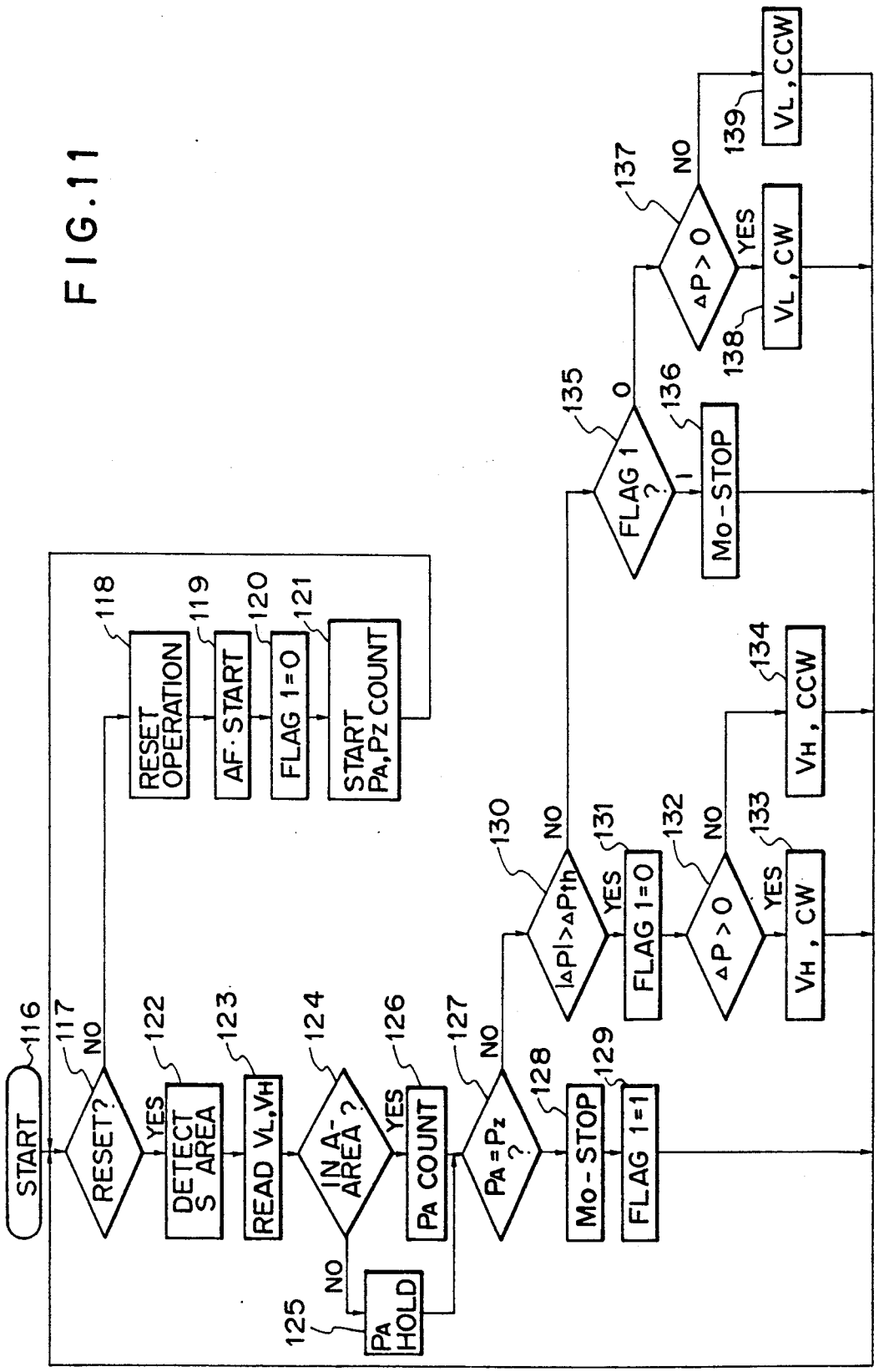
FIG. 11 is a flow chart of a microcomputer in the embodiment.

FIG. 11 shows a flow chart of the CPU 9.

At a step 116, the program starts. At a step 117, whether the initial positioning (resetting operation) of the distance ring and the zoom ring for starting the auto zooming has been terminated is discriminated. If the resetting operation is not completed, the resetting operation is performed at a step 118 and when this operation is completed, at a step 119, the control of the position of the distance ring (the forward lens group 1) is effected by an automatic focus adjusting device. Also, at a step 120, a flag 1 is set to 0 and at a step 121, counting of $P_A$ and $P_Z$ for which at a predetermined position of the distance ring (the forward lens group 1), the value of the pulse generator 21 has been reset to $P_A=0$ by the resetting operation and at a predetermined position of the zoom ring (the variator lens group 2 and compensator lens group 3), the value of the pulse generator 24 has been reset to $P_Z=0$ is started (that is, the absolute position of the distance ring after the start of AF at the step 119 can be known from the count value $P_A$).

When the resetting operation and the initial operation are terminated, at a step 122, the position of the distance ring is detected (for example, to which of the areas I, II and III of FIG. 8 the distance ring belongs is detected).

Also, at a step 123, the zoom motor speed $v_H$ during high speed and the zoom motor speed $v_L$ during low speed are read out from the ROM data in the CPU 9 which is set discretely and corresponds to FIG. 9, on the basis of the result of the detection at the step 122.

Subsequently, at a step 124, whether the distance ring is within the range indicated by A in FIG. 2 is detected. When the distance ring comes out of the area A, at a step 125, the count value $P_A$ of the pulse generator 21 is held at the last value which has been within the area A. Also, if at the step 124, it is discriminated that the position of the distance ring is within the range A of FIG. 2, advance is made to a step 126. At the step 126, counting is resumed if the count value $P_A$ has so far been held. During the counting, counting can be effected continuedly.

At a step 127, whether the two count values are $P_A=P_Z$ is discriminated. If $P_A=P_Z$, at a step 128, the zoom motor is stopped, and at a step 129, the flag 1 indicating that $P_A=P_Z$ is set to 1.

Also, if $P_A \neq P_Z$, at a step 130, whether the value of $|\Delta P|$ is above or below $\Delta Pth$ which is the threshold value for using the speed properly is discriminated. It is to be understood here that calculation of $|\Delta P| = P_A - P_Z$ is included in the step 130. If the result of the discrimination at the step 130 is $|\Delta P| > \Delta Pth$, the flag 1 is set to 0 at a step 131, whereafter at a step 132, discrimination between the positive and the negative is effected by $\Delta P$, whereby the direction of rotation of the zoom motor 23 is determined (steps 133 and 134). The speed of the zoom motor 23 used at the stage whereat at the step 130, the answer is YES is a high speed and therefore, at steps 133 and 134, the zoom motor speed $v_H$ during high speed which was read from the ROM data at the step 123 is set.

Also, if at the step 130, the answer is NO, discrimination of the state of the flag 1 is effected at a step 135. If the flag $1=1$, it means a case where after $P_A=P_Z$, advance has been made to a step 135 without becoming $|\Delta P| > \Delta Pth$ and therefore, at a step 136, the zoom motor 23 is stopped. If the flag $1=0$, it indicates that after the state of $|\Delta P| > \Delta Pth$, $|\Delta P| \leq \Delta Pth$ is assumed and advance has been made to the step 135. Accordingly, in such case, at a step 137, discrimination between the positive and the negative of $\Delta P$ is effected. In conformity with the result of this, the direction of rotation of the zoom motor is determined (steps 138 and 139). Here, the zoom motor speed is selected to a low speed and therefore, at both of the steps 138 and 139, the zoom motor is at a zoom motor speed $v_L$ during low speed.

In the first embodiment described above, there has been shown a method of dividing the distance ring position into areas I–III, and memorizing at the ROM data the substance of speed for two-speed-controlling the motor in conformity with the respective areas. While in the embodiment of FIG. 1, the number of divisions of the area and the number of speed controls are "3" and "2", respectively, this is of course not restrictive.

Description will now be made of a second embodiment in which the from-time-to-time speed is calculated and found from the value of the distance ring position. As indicated by the lines 100 and 102 in FIG. 4, the graph to be assumed by the distance ring position at a time t differs depending on the movement speed of the object, but here, as in the first embodiment, consideration is made with the most typical speed as an example. For example, in the case of the speed indicated by the line 102 in FIG. 4, the from-time-to-time differentiation value ds/dt of the line 102 of the value of the forwardly axially moved position S of the forward lens is found, and assuming that it is a speed v, v is shown as v=f(s). If at this time, two-speed control is to be effected, setting of the zoom motor speed $v_H = v \times 1.1$ during high speed and the zoom motor speed $v_L = v \times 0.7$ during low speed can be effected. In the case of this second embodiment, it follows that the speed v is calculated in the CPU 9 on the basis of the count value $P_A$ corresponding to the forward lens group S in FIG. 1 and further, the speed $v_H$ or $v_L$ is selected from the value of the difference $\Delta P$ and the zoom motor is driven.

A third embodiment of the present invention will now be described. In the first and second embodiments, the speed of the zoom motor has been made variable on the basis of the value S of the position of the forward lens group 1 (the lens for focusing) (or the pulse value $P_A$). In contrast, there is conceivable a method whereby $\Delta Pth$ is made variable on the basis of the position S (or the count value $P_A$). Particularly, where the object distance is a short distance, even if the zoom motor speed $v_H$ during high speed is used, much time is required for the count value $P_A$ to be $P_A = P_Z$, and the focal length for auto zooming becomes rather delayed. Accordingly, it is considered to be useful to make the value of $\Delta Pth$ smaller as the value S of the position of the lens group becomes greater in FIG. 4.

The flow chart of this third embodiment is realized by changing the step 123 in the flow chart of FIG. 11. That is, the value of $\Delta Pth$ varied for each area like the divided areas I–III of FIG. 9 is memorized in the ROM data in the CPU of FIG. 1, and at the step 123 of FIG. 11, a predetermined value of $\Delta Pth$ is read out from the ROM data on the basis of the result of the detection at the step 122. Then, at the step 130, the value of $\Delta Pth$ read out at the step 123 may be compared with the value of $\Delta P$.

The present embodiment is concerned with control in which the lens group for zooming is moved on the basis of a variation in the position of the lens group for focusing and the size of the object which is occupied in the picture plane is made substantially constant, and provides an optical instrument in which the stiffness of zooming is alleviated and a stable and readily seeable auto zooming function can be obtained.

In the above-described embodiments, focusing and zooming have been shown as being accomplished by the respective lens groups being moved in the direction of the optic axis. However, the present invention can also be carried out in other systems, for example, a system in which the thicknesses of the lenses are electrically changed to thereby accomplish focusing or zooming, and a system in which the chemical characteristics of the lenses are changed to thereby accomplish focusing or zooming.

Also, the AF system has been shown as an optical system in which the forward lens is moved to thereby accomplish focusing, but as is called the inner focus or the rear focus, focusing may be done by moving the other lenses than the forward lens or changing the thicknesses thereof.

What is claimed is:

1. An optical instrument comprising:

(a) a focusing lens;
   (b) a zooming lens;
   (c) first detecting means for detecting a position of said focusing lens;
   (d) driving means for moving said zooming lens in the direction of an optical axis with a zooming motor as a drive source; and
   (e) control means for controlling the driving of said zooming lens in accordance with an output of said first detecting means so as to make the size of an object which is occupied in the picture plane substantially constant regardless of the distance to the object, said control means varying the driving speed of said zooming motor in accordance with the output of said first detecting means.

2. An optical instrument according to claim 1, wherein said control means drives said zooming motor at a first driving speed when said focusing lens is in an in-focus state on the close distance side, and drives said zooming motor at a second driving speed lower than said first driving speed when said focusing lens is in the in-focus state on the infinity side.

3. An optical instrument according to claim 1, wherein, in said control means, a plurality of driving speeds are stored in memory means.

4. An optical instrument according to claim 1, wherein said focusing lens is driven in the direction of the optical axis by a focusing motor.

5. An optical instrument according to claim 4, further comprising auto focus means for placing said focusing lens in an in-focus state, said auto focus means including a sensor for detecting the in-focus state and an out-focus state of said focusing lens, said focusing motor being driven to bring said focusing lens into said in-focus state when in said out-focus state.

6. An optical instrument according to claim 1, wherein said first detecting means includes an encoder for detecting the position of said focusing lens.

7. An optical instrument according to claim 1, wherein a camera is used as said optical instrument.

8. An optical instrument comprising:

(a) a focusing lens;
   (b) a zooming lens;
   (c) first detecting means for detecting the position of said focusing lens;
   (d) second detecting means for detecting the position of said zooming lens;
   (e) first driving means for moving said focusing lens in the direction of an optical axis with a focusing motor as a drive source;
   (f) second driving means for moving said zooming lens in the direction of the optical axis with a zooming motor as a drive source; and
   (g) control means for moving said zooming lens in accordance with the relative position information of said two lenses based on an output of said first detecting means and said second detecting means and making the size of an object which is occupied in the picture plane substantially constant regardless of an alteration of the distance to the object, said control means varying a condition for the start of driving of said zooming motor in accordance with the output of said first detecting means.

9. An optical instrument according to claim 8, wherein said control means drives said zooming motor after first relative position information is generated when said focusing lens is positioned on the close distance side, and drives said zooming motor after second relative position information greater in absolute value than said first relative position information is generated when said focusing lens is positioned on the infinity side.

10. An optical instrument according to claim 8, wherein said relative position information is obtained by a microcomputer.

11. An optical instrument according to claim 8, wherein said first detecting means includes an encoder for detecting the position of said focusing lens.

12. An optical instrument according to claim 8, wherein said second detecting means includes an encoder for detecting the position of said zooming lens.

13. An optical instrument according to claim 8, further comprising auto focus means for placing said focusing lens in an in-focus state, said auto focus means including a sensor for detecting the in-focus state and an out-focus state of said focusing lens, said first motor being driven to bring said focusing lens into said in-focus sate when in said out-focus state.

14. An optical instrument according to claim 8, wherein a camera is used as said optical instrument.

* * * * *

UNITED STATES PATENT AND TRADEMARK OFFICE
CERTIFICATE OF CORRECTION

PATENT NO. : 5,173,807
DATED : December 22, 1992
INVENTOR(S) : Naoya KANEDA, et al.

It is certified that error appears in the above-identified patent and that said Letters Patent is hereby corrected as shown below:

COLUMN 3:

line 61, "change over" should read --changeover--.

COLUMN 7:

line 54, "optic" should read --optical--; and
    line 63, "as is called the" should read --for the
      so-called--.

COLUMN 10:

line 10, "sate" should read --state--.

Signed and Sealed this

Eighteenth Day of January, 1994

Attest:

BRUCE LEHMAN

*Attesting Officer*  *Commissioner of Patents and Trademarks*